(12) United States Patent
Sabo et al.

(10) Patent No.: US 12,209,822 B2
(45) Date of Patent: Jan. 28, 2025

(54) HEAT EXCHANGERS HAVING A THREE-DIMENSIONAL LATTICE STRUCTURE

(71) Applicant: General Electric Company, Schenectady, NY (US)

(72) Inventors: Nicolas Kristopher Sabo, West Chester, OH (US); Samuel Noah Miller, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 850 days.

(21) Appl. No.: 17/188,038

(22) Filed: Mar. 1, 2021

(65) Prior Publication Data

US 2021/0207897 A1    Jul. 8, 2021

Related U.S. Application Data

(63) Continuation of application No. 16/035,009, filed on Jul. 13, 2018, now Pat. No. 10,955,200.

(51) Int. Cl.
*F28F 7/02* (2006.01)
*B22F 5/10* (2006.01)
(Continued)

(52) U.S. Cl.
CPC ............... *F28F 7/02* (2013.01); *B22F 5/106* (2013.01); *B23P 15/26* (2013.01); *F28F 9/22* (2013.01);
(Continued)

(58) Field of Classification Search
CPC .......... F28F 7/02; F28F 9/22; F28F 2009/222; B22F 5/106; B22F 10/00; B22F 10/25; B23Y 80/00; F28D 7/1607
(Continued)

(56) References Cited

U.S. PATENT DOCUMENTS 3,940,837 A    3/1976  Wiese
4,547,943 A    10/1985 Hoeffken
(Continued)

OTHER PUBLICATIONS

PCT International Search Report Corresponding to PCT/US2019/041202 on Nov. 6, 2019.
(Continued)

*Primary Examiner* — Claire E Rojohn, III
(74) *Attorney, Agent, or Firm* — Dority & Manning, P.A.

(57) ABSTRACT

A heat exchanger may include a three-dimensional lattice of integrally formed unit cells, a first furcated-pathway baffle integrally formed among the three-dimensional lattice, and/or a second furcated-pathway baffle integrally formed among the three-dimensional lattice. The three-dimensional lattice of integrally formed unit cells may include an interior pathway-cell surface contiguously defining a first furcated fluid domain, and an exterior pathway-cell surface contiguously defining a second furcated fluid domain. The first furcated-pathway baffle may contiguously define a first boundary to the first furcated fluid domain. The first furcated-pathway baffle may include an exterior baffle-cell surface contiguous with at least a portion of the exterior pathway-cell surface. The second furcated-pathway baffle may contiguously define a second boundary to the second furcated fluid domain. The second furcated-pathway baffle may include an interior baffle-cell surface contiguous with at least a portion of the interior pathway-cell surface.

19 Claims, 7 Drawing Sheets

(51) Int. Cl.
  *B22F 10/00* (2021.01)
  *B22F 10/25* (2021.01)
  *B22F 10/28* (2021.01)
  *B23P 15/26* (2006.01)
  *B33Y 80/00* (2015.01)
  *F28D 7/16* (2006.01)
  *F28F 9/22* (2006.01)

(52) U.S. Cl.
  CPC .............. *B22F 10/00* (2021.01); *B22F 10/25* (2021.01); *B22F 10/28* (2021.01); *B33Y 80/00* (2014.12); *F28D 7/1607* (2013.01); *F28F 2009/222* (2013.01)

(58) Field of Classification Search
  USPC ........................................................ 165/164
  See application file for complete search history.

(56) References Cited

U.S. PATENT DOCUMENTS

| | | | |
|---|---|---|---|
| 4,600,052 A * | 7/1986 | Wood, III | F28F 7/00 165/DIG. 395 |
| 4,607,689 A | 8/1986 | Mochida et al. | |
| 4,787,443 A * | 11/1988 | Fukatsu | F28D 7/0058 165/181 |
| 5,150,520 A | 9/1992 | DeRisi | |
| 5,269,372 A * | 12/1993 | Chu | F28F 3/12 257/E23.098 |
| 5,927,097 A * | 7/1999 | Wright | F24F 1/0087 261/153 |
| 6,221,463 B1 * | 4/2001 | White | F28F 3/04 55/440 |
| 7,646,608 B2 * | 1/2010 | Thompson | H01L 24/72 165/185 |
| 7,866,377 B2 * | 1/2011 | Slaughter | B22F 3/1115 700/120 |
| 7,871,578 B2 | 1/2011 | Schmidt | |
| 7,997,328 B2 | 8/2011 | Kim et al. | |
| 9,200,855 B2 | 12/2015 | Kington et al. | |
| 9,440,216 B2 | 9/2016 | Ryan | |
| 9,657,999 B2 | 5/2017 | Newman et al. | |
| 9,874,412 B2 | 1/2018 | Cummins | |
| 9,915,047 B2 | 3/2018 | Burt | |
| 10,107,555 B1 * | 10/2018 | Miller | B23P 15/26 |
| 10,209,009 B2 | 2/2019 | Gerstler et al. | |
| 10,302,252 B2 | 5/2019 | Kuczek et al. | |
| 10,365,047 B2 | 7/2019 | Lassini et al. | |
| 10,369,540 B2 * | 8/2019 | Lo | B01J 19/0013 |
| 10,493,693 B1 | 12/2019 | Robinson | |
| 10,690,419 B2 | 6/2020 | Koga et al. | |
| 10,704,841 B2 | 7/2020 | Manzo | |
| 10,948,237 B2 * | 3/2021 | Wiedenhoefer | F28F 13/06 |
| 10,955,200 B2 * | 3/2021 | Sabo | B23P 15/26 |
| 11,280,554 B2 * | 3/2022 | Horoszczak | F28F 7/02 |
| 11,320,214 B2 * | 5/2022 | Degner | B33Y 80/00 |
| 11,407,034 B2 * | 8/2022 | Fasano | B23K 26/082 |
| 11,453,160 B2 * | 9/2022 | Colson | B29C 64/153 |
| 11,460,252 B2 * | 10/2022 | Colson | F28F 9/002 |
| 11,511,346 B2 * | 11/2022 | LaRose | B22F 10/00 |
| 11,661,986 B2 * | 5/2023 | Trivedi | F16D 65/128 703/1 |
| 11,703,283 B2 * | 7/2023 | Colson | B22F 10/28 165/165 |
| 11,719,492 B2 * | 8/2023 | Tholence | F28D 15/0233 165/104.11 |
| 11,754,341 B2 * | 9/2023 | Horoszczak | F28F 1/006 165/110 |
| 11,802,742 B2 * | 10/2023 | Fujiwara | F28F 7/02 |
| 2010/0282451 A1 | 11/2010 | Singh et al. | |
| 2010/0300666 A1 | 12/2010 | Hislop et al. | |
| 2012/0181006 A1 | 7/2012 | Angiolini | |
| 2013/0299148 A1 | 11/2013 | Hernon et al. | |
| 2014/0251585 A1 * | 9/2014 | Kusuda | F28D 1/0226 165/164 |
| 2015/0152614 A1 | 6/2015 | Burt | |
| 2016/0076384 A1 | 3/2016 | Snyder et al. | |
| 2016/0108814 A1 | 4/2016 | Schmitz | |
| 2016/0116218 A1 | 4/2016 | Shedd et al. | |
| 2016/0116222 A1 | 4/2016 | Shedd et al. | |
| 2016/0131441 A1 | 5/2016 | Newman et al. | |
| 2016/0202003 A1 * | 7/2016 | Gerstler | F28D 9/00 |
| 2016/0230595 A1 | 8/2016 | Wong et al. | |
| 2017/0114667 A1 * | 4/2017 | Sabo | F02C 3/04 |
| 2017/0198979 A1 | 7/2017 | St. Rock et al. | |
| 2017/0234812 A1 * | 8/2017 | Abbott | G01N 23/083 378/53 |
| 2017/0248372 A1 | 8/2017 | Erno et al. | |
| 2017/0335689 A1 | 11/2017 | Golan et al. | |
| 2017/0336149 A1 | 11/2017 | Ribaraov et al. | |
| 2018/0017331 A1 | 1/2018 | Veilleux, Jr. et al. | |
| 2018/0038654 A1 * | 2/2018 | Popp | F28D 7/1684 |
| 2018/0043482 A1 | 2/2018 | Vos et al. | |
| 2018/0187984 A1 | 7/2018 | Manzo | |
| 2018/0245854 A1 * | 8/2018 | Sabo | F28F 13/12 |
| 2019/0154345 A1 * | 5/2019 | Martinez | B33Y 80/00 |
| 2020/0016704 A1 * | 1/2020 | Stewart, Jr. | B23P 15/26 |
| 2020/0018560 A1 * | 1/2020 | Sabo | F28F 7/02 |
| 2020/0215480 A1 * | 7/2020 | Roy | B01D 71/022 |
| 2020/0298652 A1 * | 9/2020 | Bailey | B60H 1/00342 |
| 2020/0363133 A1 * | 11/2020 | Gerstler | F28F 9/0275 |
| 2021/0154771 A1 * | 5/2021 | Kenworthy | B23K 26/0648 |
| 2022/0003503 A1 * | 1/2022 | Iyer | B01D 69/10 |
| 2022/0032555 A1 * | 2/2022 | Czinger | B29C 66/1122 |
| 2022/0186664 A1 * | 6/2022 | Johns | F02C 7/14 |
| 2022/0203452 A1 * | 6/2022 | Miller | B33Y 10/00 |
| 2022/0288850 A1 * | 9/2022 | Kenworthy | B29C 64/245 |

OTHER PUBLICATIONS

PCT Written Opinion Corresponding to PCT/US2019/041202 on Nov. 6, 2019.
Native Dynamics, Neutrium, Pressure Loss from Fittings—Equivalent Length Method, 2018, 8 pages.
Native Dynamics, Neutrium, Pressure Loss from Fittings—Excess Head (K) Method, 2018, 10 pages.
Native Dynamics, Neutrium, Pressure Loss from Pipe Entrances and Exits, 2018, 4 Pages.

* cited by examiner

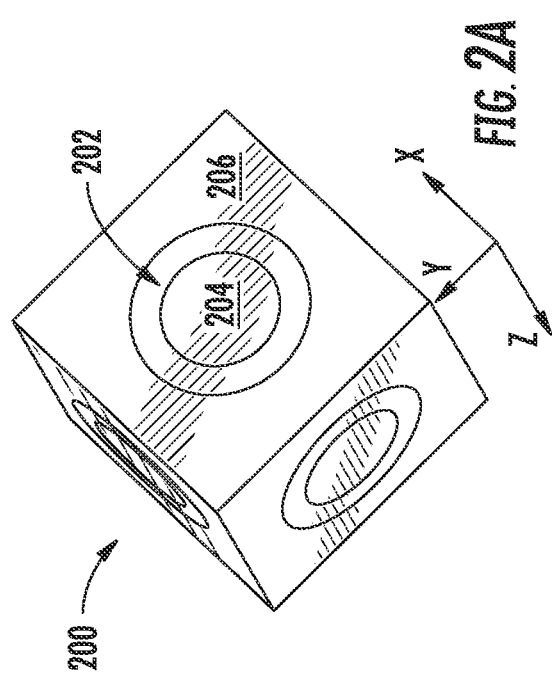
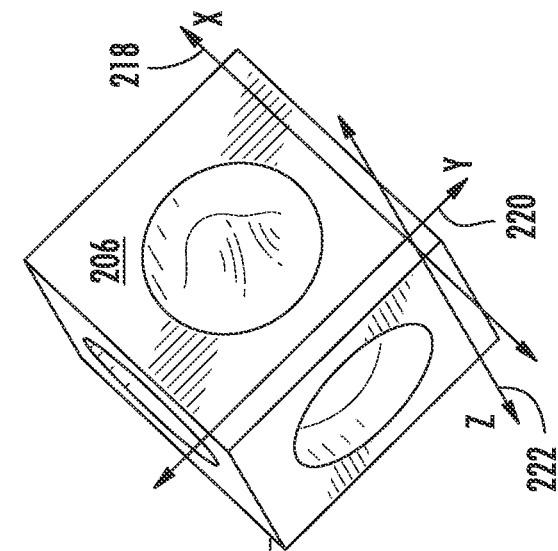
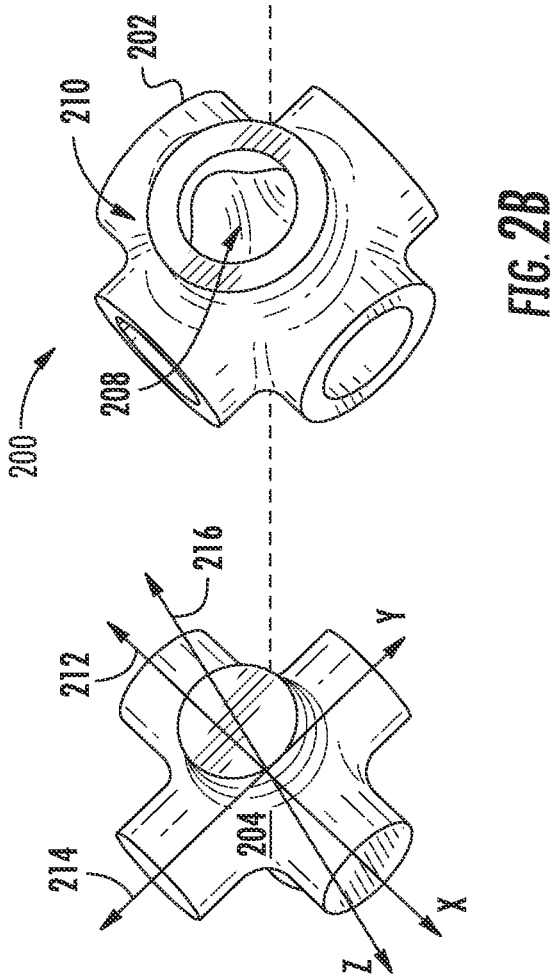
FIG. 2A
FIG. 2B

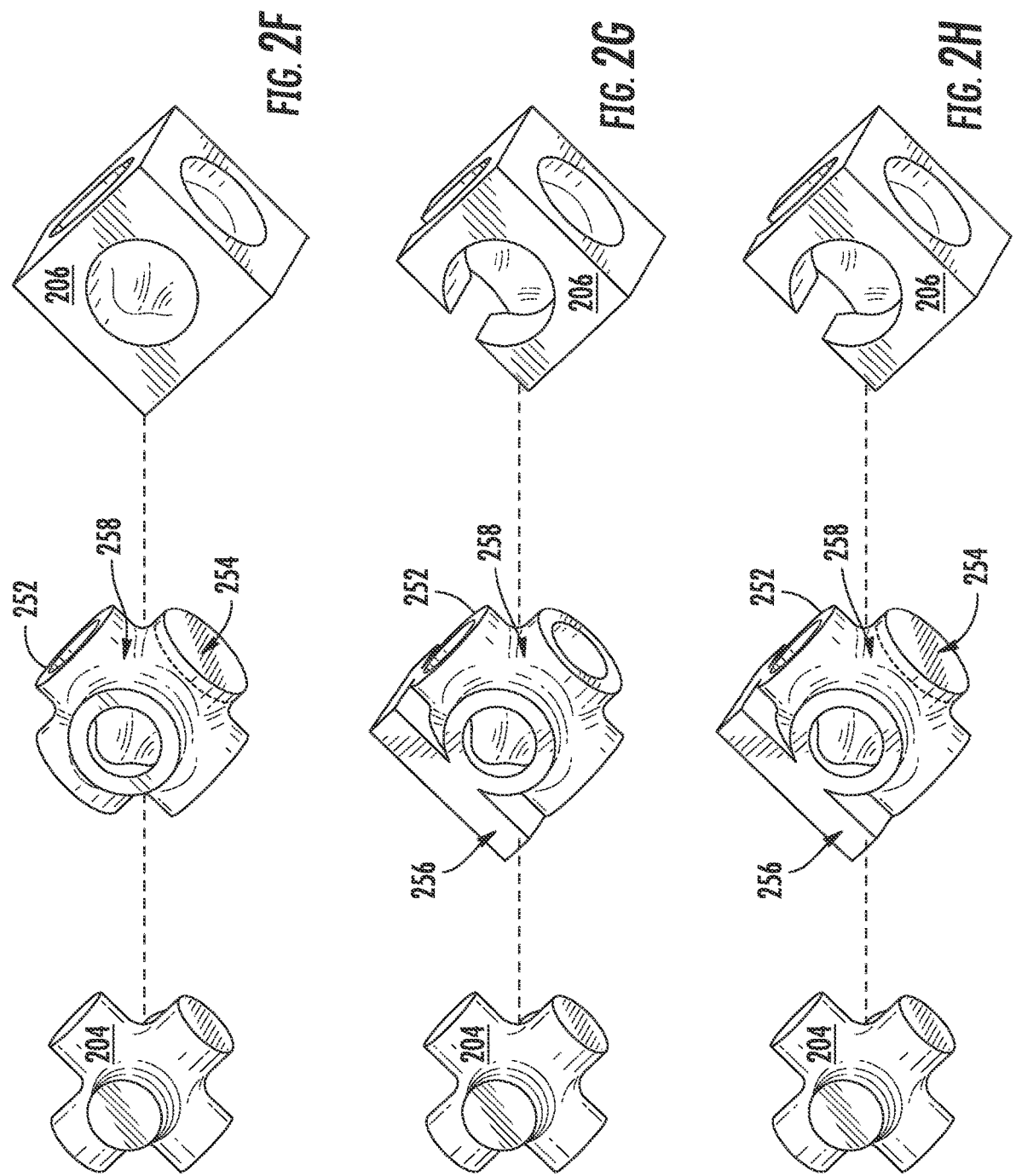

| Type | Shape | r/D | K-value |
|---|---|---|---|
| Inward Projecting/Re-entrant | | - | K = 0.78 |
| Flush/Square-Edged | | 0 | K = 0.5 |
| Rounded | | 0.02 | K = 0.28 |
| | | 0.04 | K = 0.24 |
| | | 0.06 | K = 0.15 |
| | | 0.10 | K = 0.09 |
| | | 0.15+ | K = 0.04 |
| Chamfered | | - | K = 0.25 |

FIG. 4

HEAT EXCHANGERS HAVING A THREE-DIMENSIONAL LATTICE STRUCTURE

CROSS-REFERENCE TO RELATED APPLICATIONS

This application is a continuation of U.S. application Ser. No. 16/035,009, filed Jul. 13, 2018, the contents of which is incorporated herein by reference in its entirety as if set forth verbatim.

FIELD

The present disclosure generally pertains to heat exchangers that have a three-dimensional lattice structure with baffle cells and methods of forming baffles in a three-dimensional lattice structure of a heat exchanger.

BACKGROUND

Heat exchangers sometimes utilize baffles to direct or regulate fluid flow. A typical shell and tube heat exchanger may include baffles on the shell side of the heat exchanger which direct shell-side fluid through a flow passage defined by the baffles. The baffles may also serve to support a tube bundle within the heat exchanger shell. Such baffles are typically fabricated from panels that have numerous holes corresponding to each tube in the tube bundle. The holes of a panel are fitted over the heat exchanger tubes, and the panel is welded in place.

The fabrication process for baffles of this nature can be complicated and time consuming, and consequently heat exchangers typically have fairly simple baffle configurations. Additionally, heat exchanger tubes are prone to damage when fitting and welding the baffles to the tubes, and leaks or stress points may arise from fabrication errors such as faulty welds and the like, leading to suboptimum performance, cross-contamination of fluids, or structural failures. Further, the tube-side of a heat exchanger typically lacks baffles due to the complexity of fabrication, especially for heat exchangers with numerous tubes. Three-dimensional lattice structures provide an alternative to a tube bundle. However, the above-mentioned shortcomings may become even more pronounced when adding baffles to a three-dimensional lattice structure because a lattice structure may have a far more complicated configuration relative to a typical tube bundle.

A heat exchanger may be coupled to a fluid flow at an inlet manifold that defines an inlet plenum where fluid enters the heat exchanger. A typical shell and tube heat exchanger includes a tube sheet, which is a panel at the interface between the inlet plenum and the tube bundle that directs fluid into the tubes of the heat exchanger. The fluid pathway from the inlet plenum into the tube bundle typically exhibits a relatively abrupt transition. This abrupt transition may cause significant shear stress and corresponding pressure drop which may impact process design considerations. A similar abrupt transition may exist with previous heat exchangers that employ a three-dimensional lattice structure rather than a tube bundle.

Accordingly, there exists a need for heat exchangers with improved baffles and improved inlet plenum. Additionally, there exists a need for improved methods of forming baffles in a heat exchanger, and methods of reducing the pressure drop of fluid entering the three-dimensional lattice of a heat exchanger.

BRIEF DESCRIPTION

Aspects and advantages will be set forth in part in the following description, or may be obvious from the description, or may be learned through practicing the presently disclosed subject matter.

In one aspect, the present disclosure embraces heat exchangers that have a plurality of integrally formed contiguous unit cells defining a three-dimensional lattice of repeating unit cells. In some embodiments, the plurality of integrally formed contiguous unit cells include a plurality of pathway cells and a plurality of baffle cells integrally formed among the plurality of pathway cells. The plurality of pathway cells have a solid domain that includes an interior pathway-cell surface contiguously defining a first furcated fluid domain for a first fluid to flow across the plurality of pathway cells, and an exterior pathway-cell surface contiguously defining a second furcated fluid domain for a second fluid to flow across the plurality of pathway cells. The plurality of baffle cells have a solid domain that includes one or more first furcated-pathway blinds together providing one or more first furcated-pathway baffles and/or one or more second furcated-pathway blinds together providing a one or more second furcated-pathway baffles. Each of the first furcated-pathway baffles contiguously define a first boundary to the first furcated fluid domain, and each of the second furcated-pathway baffles contiguously define a second boundary to the second furcated fluid domain.

In some embodiments, the interior pathway-cell surface of the plurality of pathway cells and the one or more first furcated-pathway baffles together define a first furcated flow passage for the first fluid to flow through the first furcated fluid domain, and the exterior pathway-cell surface of the plurality of pathway cells and the one or more second furcated-pathway baffles together define a second furcated flow passage for the second fluid to flow through the second furcated fluid domain. The first furcated flow passage may include a first flow orientation and the second furcated flow passage may include a second flow orientation. The first flow orientation may differ from the second flow orientation.

In another aspect, the present disclosure embraces heat exchangers that have a plurality of integrally formed contiguous unit cells defining a three-dimensional lattice of repeating unit cells, in which the plurality of integrally formed contiguous unit cells includes a plurality of partial unit cells. The plurality of integrally formed contiguous unit cells include a plurality of pathway cells. The plurality of pathway cells have a solid domain that includes an interior pathway-cell surface contiguously defining a first furcated fluid domain for a first fluid to flow across the plurality of pathway cells, and an exterior pathway-cell surface contiguously defining a second furcated fluid domain for a second fluid to flow across the plurality of pathway cells.

The first furcated fluid domain may be configured and arranged such that the first fluid flows across the plurality of pathway cells following a first furcated flow passage from a first-fluid inlet region to a first-fluid outlet region. The second furcated fluid domain may be configured and arranged such that the second fluid flows across the plurality of pathway cells following a second furcated flow passage from a second-fluid inlet region to a second-fluid outlet region. The plurality of integrally formed contiguous unit cells may additionally include a plurality of partial unit cells conforming to the solid domain. The plurality of partial unit cells may introduce a partial phase-shift to the three-dimensional lattice of repeating unit cells such that the first fluid domain comprises a first rounded unit cell entrance and the second fluid domain comprises a second rounded unit cell entrance.

In another aspect, the present disclosure embraces methods of forming a baffle in a three-dimensional lattice structure of a heat exchanger. Exemplary methods include forming a plurality of integrally formed contiguous unit cells defining a three-dimensional lattice of repeating unit cells. Forming the plurality of integrally formed contiguous unit cells includes forming a plurality of pathway cells and forming a plurality of baffle cells integrally among the plurality of pathway cells. The plurality of pathway cells may be formed so as to have a solid domain that includes an interior pathway-cell surface contiguously defining a first furcated fluid domain for a first fluid to flow across the plurality of pathway cells, and an exterior pathway-cell surface contiguously defining a second furcated fluid domain for a second fluid to flow across the plurality of pathway cells. The plurality of baffle cells may be formed so as to have a solid domain that includes one or more first furcated-pathway baffles and/or one or more second furcated-pathway baffles. Each of the first furcated-pathway baffles may be formed so as to contiguously define a first boundary to the first furcated fluid domain, and each of the second furcated-pathway baffles may be formed so as to contiguously define a second boundary to the second furcated fluid domain.

In another aspect, the present disclosure embraces methods of reducing a pressure drop at the inlet of a three-dimensional lattice structure of a heat exchanger. An exemplary method includes forming a plurality of integrally formed contiguous unit cells defining a three-dimensional lattice of repeating unit cells that includes a plurality of pathway cells. The plurality of pathway cells may be formed so as to have a solid domain that includes an interior pathway-cell surface contiguously defining a first furcated fluid domain for a first fluid to flow across the plurality of pathway cells, and an exterior pathway-cell surface contiguously defining a second furcated fluid domain for a second fluid to flow across the plurality of pathway cells.

The first furcated fluid domain may be formed with a configuration and arrangement such that the first fluid flows across the plurality of pathway cells following a first furcated flow passage from a first-fluid inlet region to a first-fluid outlet region. The second furcated fluid domain may be formed with a configuration and arrangement such that the second fluid flows across the plurality of pathway cells following a second furcated flow passage from a second-fluid inlet region to a second-fluid outlet region. In some embodiments, forming the plurality of integrally formed contiguous unit cells may include forming a plurality of partial unit cells. The plurality of partial unit cells may be formed so as to introduce a partial phase-shift to the three-dimensional lattice of repeating unit cells such that the first fluid domain includes a first rounded unit cell entrance and the second fluid domain includes a second rounded unit cell entrance.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 2A-2H schematically depict exemplary unit cells, with the unit cells depicted in FIGS. 2A and 2B being pathway cells and the unit cells depicted in FIGS. 2C-2H being baffle cells;

FIG. 4 shows exemplary entrance geometry for unit cells and exemplary resistance coefficients corresponding to such exemplary entrance geometry;

Figure 1:
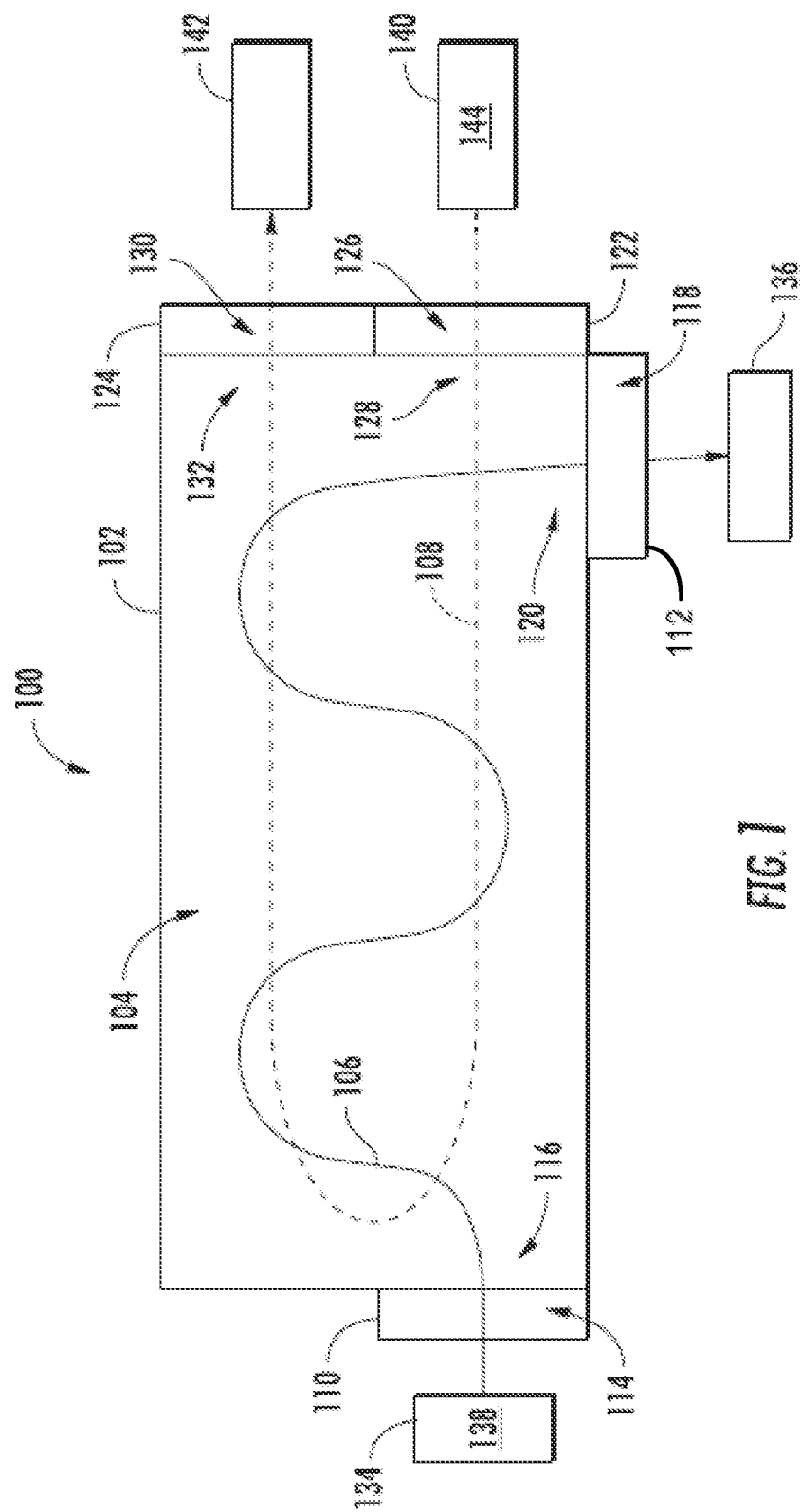
FIG. 1 schematically depicts an exemplary heat exchanger, within which is disposed a plurality of integrally formed contiguous unit cells which together define a three-dimensional lattice of repeating unit cells.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

The present disclosure generally provides heat exchangers that have a three-dimensional lattice structure with baffle cells. An exemplary heat exchanger includes a plurality of integrally formed contiguous unit cells defining a three-dimensional lattice of repeating unit cells. The integrally formed contiguous unit cells include a plurality of pathway cells and a plurality of baffle cells. The pathway cells and the baffle cells conform to the three-dimensional lattice, and the baffle cells are integrally formed among the pathway cells. The present disclosure additionally embraces methods of forming baffles in a three-dimensional lattice structure of a heat exchanger.

The presently disclosed heat exchangers may provide for improved manufacturability. For example, the three-dimensional lattice may be modeled as an array of integrally formed contiguous unit cells, which together define a three-dimensional lattice of repeating unit cells. The three-dimensional lattice structure can be quickly and accurately manufactured, for example using an additive manufacturing technology, in any desired size, shape, or configuration, and with any desired number or combination of unit cells. The arrangement of the baffle cells within the three-dimensional lattice may be modified without changing the configuration of the three-dimensional lattice. As such, a wide variety of flow passages may be provided starting from the same three-dimensional lattice configuration. For example, a flow passage may be customized for a particular application without changing the configuration of the three-dimensional lattice.

The flow passage may be selected to provide desired heat transfer properties, which may provide for improved heat transfer. For example, the baffle cells may provide an increased effective length of the heat exchanger, while partial pathway cells and corresponding rounded unit cell entrances may provide a reduced pressure loss. Additionally, the baffle cells may provide added structural support to the three-dimensional lattice. Baffle cells may be provided in the three-dimensional lattice in any desired configuration, allowing for each separate fluid that flows through the three-dimensional lattice structure of the heat exchanger to follow its own independent flow passage. A plurality of baffle cells may define a flow passage for one or more fluids that flow through the three-dimensional lattice.

The pathway cells may be include partial pathway cells, which introduce a partial phase-shift to the three-dimensional lattice of repeating unit cells, which allows the repeating unit cells to include a rounded unit cell entrance to both a first fluid domain and a second fluid domain. Such a rounded unit cell entrance lowers or minimizes the pressure loss of fluid entering the unit cells according to a resistance coefficient, K corresponding to the entrance geometry of the unit cells.

The presently disclosed heat exchangers and three-dimensional lattice structures and corresponding unit cells may be employed in any desired setting. As an example, presently disclosed heat exchangers and three-dimensional lattice structures may be employed in connection with a turbomachine or in connection with an electric machine. Some examples where such a turbomachine and/or an electric machine may be utilized include aircraft, marine vessels, motor vehicles, power generation facilities, manufacturing facilities, industrial machinery, and the like. In the context of an aircraft, a turbomachine may take the form of a turbofan engine, and an electric machine may be used to supply power to such a turbomachine engine. Such an aircraft may include a commercial, military, or civilian aircraft, as well as unmanned aircraft such as unmanned aerial vehicles, electric rotorcraft, drones, and the like. It will be appreciated that the presently disclosed heat exchangers and three-dimensional lattice structures and corresponding unit cells may be used in numerus other settings, and it is intended that the presently disclosed heat exchangers and three-dimensional lattice structures and corresponding unit cells may be implemented in any setting without departing from the scope or spirit of the present disclosure.

Figure 2C:
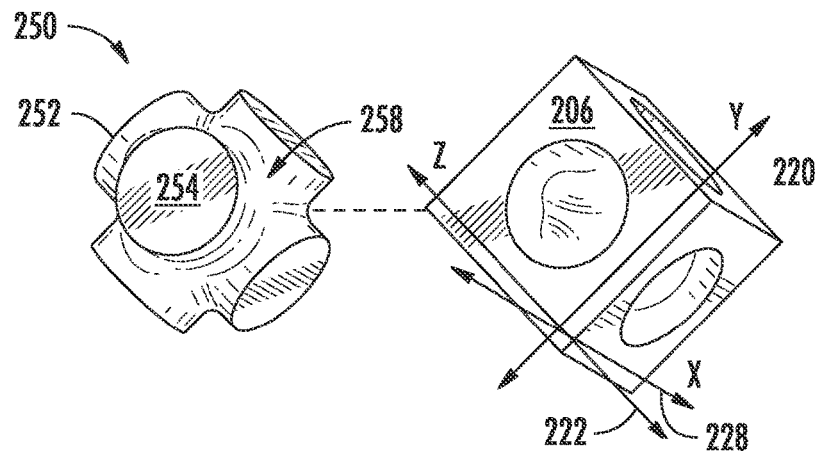
Figure 2D:
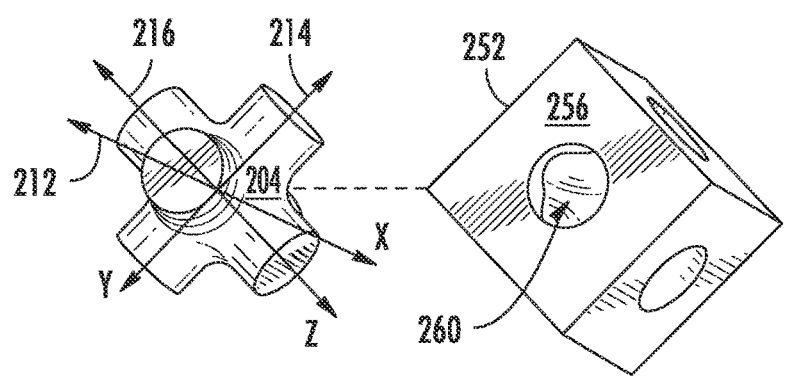

Various embodiments of the present disclosure will now be described in greater detail. Referring to FIG. 1, an exemplary heat exchanger 100 is shown. The heat exchanger 100 includes a body 102, within which is disposed a plurality of integrally formed contiguous unit cells (FIGS. 2A-2H), which together define a three-dimensional lattice 104 of repeating unit cells (FIGS. 3A-3C). The heat exchanger 100 includes pathways for at least two fluids to flow through the three-dimensional lattice 104 of repeating unit cells. The embodiment shown includes two pathways; however, it will be appreciated that additional pathways may be provided without departing from the spirit or scope of the present disclosure. In fact, any desired number of pathways may be provided, including three, four, five, or more pathways. As shown, a first flow passage 106 allows a first fluid to flow through the three-dimensional lattice 104 of repeating unit cells, and a second flow passage 108 allows a second fluid to flow through the three-dimensional lattice 104 of repeating unit cells. As described herein, the first flow passage 106 includes a first furcated fluid domain through which a first fluid flows, and the second pathway includes a second furcated fluid domain through which the second fluid flows.

The heat exchanger 100 may include one or more inlet manifolds and/or outlet manifolds operably coupled to or integrally formed with the body 102 of the heat exchanger. As shown, a first-fluid inlet manifold 110 and a first-fluid outlet manifold 112 may be operably coupled to or integrally formed with the body 102 of the heat exchanger 100. An interior surface of the first-fluid inlet manifold 110 defines a first-fluid inlet plenum 114 in fluid communication with a first-fluid inlet region 116 of the first furcated fluid domain. An interior surface of the first-fluid outlet manifold 112 defines a first-fluid outlet plenum 118 in fluid communication with a first-fluid outlet region 120 of the first furcated fluid domain. Additionally, a second-fluid inlet manifold 122 and a second-fluid outlet manifold 124 are operably coupled to or integrally formed with the body 102 of the heat exchanger 100. An interior surface of the second-fluid inlet manifold 122 defines a second-fluid inlet plenum 126 in fluid communication with a second-fluid inlet region 128 of the second furcated fluid domain. An interior surface of the second-fluid outlet manifold 124 defines a second-fluid outlet plenum 130 in fluid communication with a second-fluid outlet region 132 of the second furcated fluid domain.

The heat exchanger 100 may be in fluid communication with a first-fluid source 134 and/or a first-fluid destination 136, provided for example by one or more pipes or the like operably coupled to or integrally formed with the heat exchanger 100, such as the first-fluid inlet manifold 110 and the first-fluid outlet manifold 112, respectively. The first-fluid source 134 provides a first fluid 138 to the heat exchanger 102, which first fluid 138 flows through the first furcated fluid domain as described herein. After exiting the heat exchanger 102, the first fluid 138 may flow to the first-fluid destination 136. Likewise, the heat exchanger 100 may be in fluid communication with a second-fluid source 140 and/or a second-fluid destination 142, provided for example by one or more pipes or the like operably coupled to or integrally formed with the heat exchanger 100, such as the second-fluid inlet manifold 122 and the second-fluid outlet manifold 124, respectively. The second-fluid source 140 provides a second fluid 144 to the heat exchanger 102, which second fluid 144 flows through the second furcated fluid domain as described herein. After exiting the heat exchanger 102, the second fluid 144 may flow to the second-fluid destination 142.

The first fluid 138 may be a process fluid, such as a lubricant and/or or a coolant. Such a process fluid may be used, for example to lubricate and/or cool an engine such as a turbofan engine or an electric machine. The second fluid 144 may be a coolant, such as liquid or air. Such as coolant may be used, for example, to cool the first fluid 138, such as a process fluid. In an exemplary embodiment, the first fluid 138 is a liquid coolant used for extracting heat from a turbofan engine or an electric machine, and the second fluid 144 is a liquid or air used to cool the first fluid 138.

Now turning to FIGS. 2A-2H, exemplary unit cells of a three-dimensional lattice 104 will be described. As mentioned, a plurality of integrally formed contiguous unit cells define a three-dimensional lattice 104 of repeating unit cells. A unit cell encompasses a three-dimensional space defined by at least four perimeter planes representing an individual repeating unit of the three-dimensional lattice 104. A perimeter plane of a unit cell encompasses a two-dimensional plane corresponding to a portion of the perimeter of the three-dimensional space encompassed by the unit cell. A unit cell may have any shape, size, or geometry that corresponds to individual repeating units of a three-dimensional lattice. The unit cells making up a three-dimensional lattice 104 need not each have an identical shape, size, or geometry. In fact, it will be appreciated that a three-dimensional lattice 104 of repeating unit cells may include a repeating pattern or combination of unit cells having any desired combination of shapes, sizes, or geometries. The periphery of the three-dimensional lattice 104 may be identified by the presence of a repeating pattern of unit cells, although partial unit cells may be included in the three-dimensional lattice 104. As examples, partial unit cells may be included as or near a periphery of the three-dimensional lattice 104, as or near baffle cells, or elsewhere throughout the three-dimensional lattice 104. For purposes of the present disclosure, structures that depart from the repeating pattern of unit cells are not considered part of the three-dimensional lattice 104. This includes peripheral structures such as the body 102 of a heat exchanger as well as internal structures that depart from the repeating pattern of unit cells.

A unit cell may be segmented into one or more unit-cell domains. A unit-cell domain may be a solid domain or a fluid domain. The embodiment shown includes a two fluid domains separated by a solid domain; however, it will be appreciated that additional fluid domains may be provided without departing from the spirit or scope of the present disclosure. For each additional fluid domain, an additional solid domain would be provided to separate the additional fluid domain from the other fluid domains. For example, a unit cell may include three fluid domains and two solid domains, or four fluid domains and three solid domains, and so on. In fact, any desired number of domains may be provided. The solid domain of a unit cell may be entirely solid or a hollow space may be located within the solid domain (i.e., isolated from the fluid domains). A hollow space located within the solid domain may reduce the overall weight of the three-dimensional lattice structure.

A unit cell may be a pathway cell or a baffle cell. The manner in which a unit cell is segmented into unit-cell domains determines whether the unit cell is a pathway cell or a baffle cell. FIGS. 2A and 2B show an exemplary pathway cell 200, and FIGS. 2C-2H show exemplary baffle cells 250. A unit cell includes at least four perimeter planes. As shown in FIGS. 2A-2H, a unit cell may include six perimeter planes, and the six perimeter planes may be respectively oriented normal to an X, Y, or Z axis. It will be appreciated that a unit cell may include any desired number of perimeter planes, and that a unit cell may take the form of any desired polyhedron. Additionally, it will be appreciated that the perimeter planes may be configured with any desired orientation.

Referring to FIGS. 2A and 2B, pathway cells 200 include those unit cells of a three-dimensional lattice 104 that have a solid domain 202 which defines at least two separate furcated fluid domains through which fluid can flow up to or across each perimeter plane of the unit cell. A pathway cell 200 includes at least four perimeter planes. As shown in FIGS. 2A and 2B, a pathway cell 200 may include six perimeter planes. The six perimeter planes may be respectively oriented nominal to an X, Y, or Z axis. A pathway cell 200 includes a solid domain 202 that separates and defines a plurality of furcated fluid domains. The furcated fluid domains have furcations or branches which allow fluid to flow in multiple directions throughout the three-dimensional lattice 104. It will be appreciated that any number of furcations or branches may be provided. The configuration and arrangement of such furcated fluid domains may be defined by the configuration and arrangement of the solid domain 202 of the respective unit cells that make up the three-dimensional lattice 104.

As shown, a pathway cell 200 includes a solid domain 202 that defines a first furcated fluid domain 204 and a second furcated fluid domain 206. The first furcated fluid domain 204 furcates such that a first fluid may flow across each perimeter plane of the pathway cell 200. As shown, the solid domain 202 has an interior pathway-cell surface 208 which defines a first furcated fluid domain 204, and an exterior pathway-cell surface 210 which defines a second furcated fluid domain 206. The solid domain 202 may be entirely solid or may have a hollow space located between the interior pathway-cell surface 208 and the exterior pathway-cell surface 210.

The first furcated fluid domain 204 furcates such that a first fluid 138 may flow across each perimeter plane of the pathway cell 200. As shown, the first furcated fluid domain 204 includes a pathway that furcates in three directions (e.g., a first X-pathway 212 to which a first and second perimeter plane have a normal orientation, a first Y-pathway 214 to which a third and fourth perimeter plane have a normal orientation, and a first Z-pathway 216 to which a fifth and sixth perimeter plane have a normal orientation). A plurality of integrally formed contiguous pathway cells 200 each having an interior pathway-cell surface 208 may together contiguously define a first furcated fluid domain 204 for a first fluid 138 to flow across the plurality of pathway cells 200.

The second furcated fluid domain 206 furcates such that a second fluid 144 may flow across each perimeter plane of the pathway cell 200. As shown, the second furcated fluid domain 206 includes a pathway that furcates in three directions (e.g., a second X-pathway 218 to which a first and second perimeter plane have a normal orientation, a second Y-pathway 220 to which a third and fourth perimeter plane have a normal orientation, and a second Z-pathway 222 to which a fifth and sixth perimeter plane have a normal orientation). A plurality of integrally formed contiguous pathway cells 200 each having an exterior pathway-cell surface 210 may together contiguously define a second furcated fluid domain 206 for a second fluid 144 to flow across the plurality of pathway cells 200.

Referring to FIGS. 2C-2H, baffle cells 250 include those unit cells of a three-dimensional lattice 104 that have a solid domain 252 which includes a furcated-pathway blind 254, 256 integrally formed as part of the solid domain 252. The solid domain 252 of a baffle cell 250 may include a first furcated-pathway blind 254 that defines a boundary to a first furcated fluid domain 204, and/or a second furcated-pathway blind 256 that defines a boundary to a second furcated fluid domain 206. The solid domain 252 of a baffle cell 250 may be entirely solid or may have a hollow space isolated from both the first furcated fluid domain 204 and the second furcated fluid domain 206. As discussed below with reference to FIGS. 3A-3C, a plurality of integrally formed contiguous baffle cells 250 that include a first furcated-pathway blind 254 together define a first furcated-pathway baffle, and a plurality of integrally formed contiguous baffle cells 250 that include a second furcated-pathway blind 256 together define a second furcated-pathway baffle.

A baffle cell 250 includes at least four perimeter planes. As shown, a baffle cell may include six perimeter planes. The six perimeter planes may be respectively oriented normal to an X, Y, or Z axis. A furcated-pathway blind 254, 256 defines a boundary such that fluid in a furcated fluid domain may not flow across at least one perimeter plane of the baffle cell 250. The boundary may be defined with respect to fluid flow from a furcated fluid domain 204, 206 of the baffle cell 250 to a contiguous unit cell of the three-dimensional lattice 104, or with respect to fluid flow to the baffle cell 250 from a furcated fluid domain 204, 206 of a contiguous unit cell. A furcated-pathway blind includes that portion of the solid domain 252 of a baffle cell 250 which defines such a boundary to a furcated fluid domain 204, 206 with respect to such a perimeter plane of the baffle cell 250. Even though a baffle cell 250 includes a furcated-pathway blind 254, 256, in some embodiments a baffle cell 250 may also include one or more furcated fluid domains 204, 206 through which fluid can flow up to or across one or more perimeter planes of the unit cell. However, the presence of a furcated-pathway blind 254, 256 in a unit cell distinguishes the unit cell as a baffle cell 250 as opposed to a pathway cell 200. The furcated-pathway blind 254, 256 may define a boundary to a furcated fluid domain at one or more permitted planes, including a single perimeter plane of the baffle cell 250, all perimeter planes of the baffle cell 250, or a subset of the perimeter planes of the baffle cell 250.

As shown in FIGS. 2C, 2E, 2F, 2H, the solid domain 252 of a baffle cell 250 may include a first furcated-pathway blind 254 that defines a boundary to a first furcated fluid domain 204. A plurality of integrally formed contiguous baffle cells that include a first furcated-pathway blind 254 together provide a first furcated-pathway baffle as discussed below with reference to FIGS. 3A-3C. The first furcated-pathway blind 254 may define a boundary to each perimeter plane of the baffle cell 250 (FIGS. 2C and 2E) or to a subset of the perimeter planes of the baffle cell (FIGS. 2F and 2H). With a first furcated-pathway blind 254 contiguous to another unit cell such as a pathway cell 200, fluid in the first furcated fluid domain 204 may not flow across a perimeter plane of the baffle cell 250 having the first furcated-pathway blind 254 because the first furcated-pathway blind 254 defines a boundary to the first furcated fluid domain 204.

The solid domain 252 of a baffle cell 250 may include an exterior baffle-cell surface 258 which, similar to a pathway cell 200, defines a second furcated fluid domain 206. As shown, the second furcated fluid domain 206 of the baffle cell 250 includes a pathway that furcates in three directions (e.g., the second X-pathway 218 to which a first and second perimeter plane have a normal orientation, the second Y-pathway 220 to which the third and fourth perimeter plane have a normal orientation, and the second Z-pathway 222 to which the fifth and sixth perimeter plane have a normal orientation). A baffle cell 250 having an exterior baffle-cell surface 258 may be contiguous to another baffle cell that also has an exterior baffle-cell surface 258 and/or to a pathway cell 200 having an exterior pathway-cell surface 208. A plurality of integrally formed contiguous baffle cells 250 each having an exterior baffle-cell surface 258 may together contiguously define a second furcated fluid domain 206 for a second fluid 144 to flow across the plurality of baffle cells 250. Additionally or in the alternative, one or more baffle cells 250 having an exterior baffle-cell surface 258 contiguous to one or more pathway cells 200 having an exterior pathway-cell surface 210 may together contiguously define a second furcated fluid domain 206 for a second fluid 144 to flow across the one or more baffle cells 250 and pathway cells 200.

As shown in FIGS. 2D, 2E, 2G, and 2H, the solid domain 252 of a baffle cell 250 may include a second furcated-pathway blind 256 that defines a boundary to a second furcated fluid domain 206. A plurality of integrally formed contiguous baffle cells 250 that include a second furcated-pathway blind 256 together provide a second furcated-pathway baffle as discussed below with reference to FIGS. 3A-3C. The second furcated-pathway blind 256 may define a boundary to each perimeter plane of the baffle cell 250 (FIGS. 2D and 2E) or to a subset of the perimeter planes of the baffle cell (FIGS. 2G and 2H). Additionally, the solid domain 252 of a baffle cell 250 may include both a first furcated-pathway blind 254 and second furcated-pathway blind 256 (FIGS. 2E and 2H), that respectively define boundaries to both a first furcated fluid domain 204 and second furcated fluid domain 206 (e.g., FIGS. 2A and 2B). With a second furcated-pathway blind 256 contiguous to another unit cell such as a pathway cell 200, fluid in the second furcated fluid domain 206 may not flow across a perimeter plane of the baffle cell 250 having the second furcated-pathway blind 256 because the second furcated-pathway blind 254 defines a boundary to the second furcated fluid domain 206.

The solid domain 252 of a baffle cell 250 may include an interior baffle-cell surface 260 which, similar to a pathway cell 200, defines a first furcated fluid domain 204. As shown, the first furcated fluid domain 204 of the baffle cell 250 includes a pathway that furcates in three directions (e.g., the first X-pathway 212 to which a first and second perimeter plane have a normal orientation, the first Y-pathway 214 to which a third and fourth perimeter plane have a normal orientation, and the first Z-pathway 216 to which a fifth and sixth perimeter plane have a normal orientation). A baffle cell 250 having an interior baffle-cell surface 260 may be contiguous to another baffle cell that also has an interior baffle-cell surface 260 and/or to a pathway cell 200 having an interior pathway-cell surface 208. A plurality of integrally formed contiguous baffle cells 250 each having an interior baffle-cell surface 260 may together contiguously define a first furcated fluid domain 204 for a first fluid 138 to flow across the plurality of baffle cells 250. Additionally or in the alternative, one or more baffle cells 250 having an interior baffle-cell surface 260 contiguous to one or more pathway cells 200 having an interior pathway-cell surface 208 may together contiguously define a first furcated fluid domain 204 for a first fluid 138 to flow across the one or more baffle cells 250 and pathway cells 200.

Figure 2E:
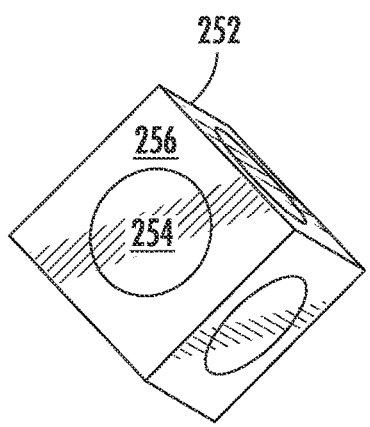
Figure 3A:
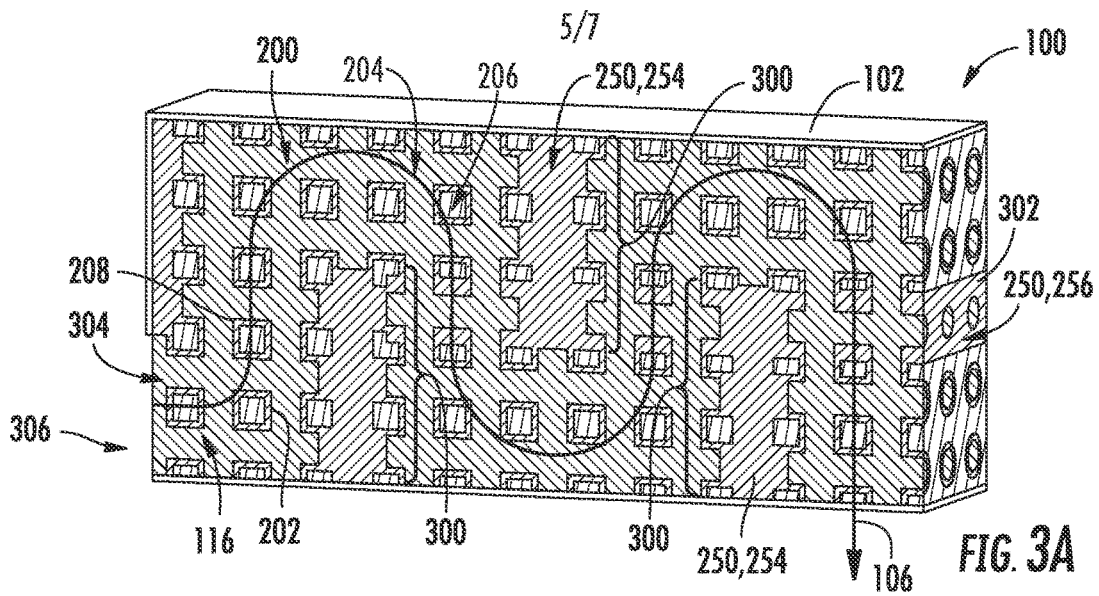
FIGS. 3A-3C schematically depict an exemplary three-dimensional lattice of repeating unit cells.
Figure 3B:
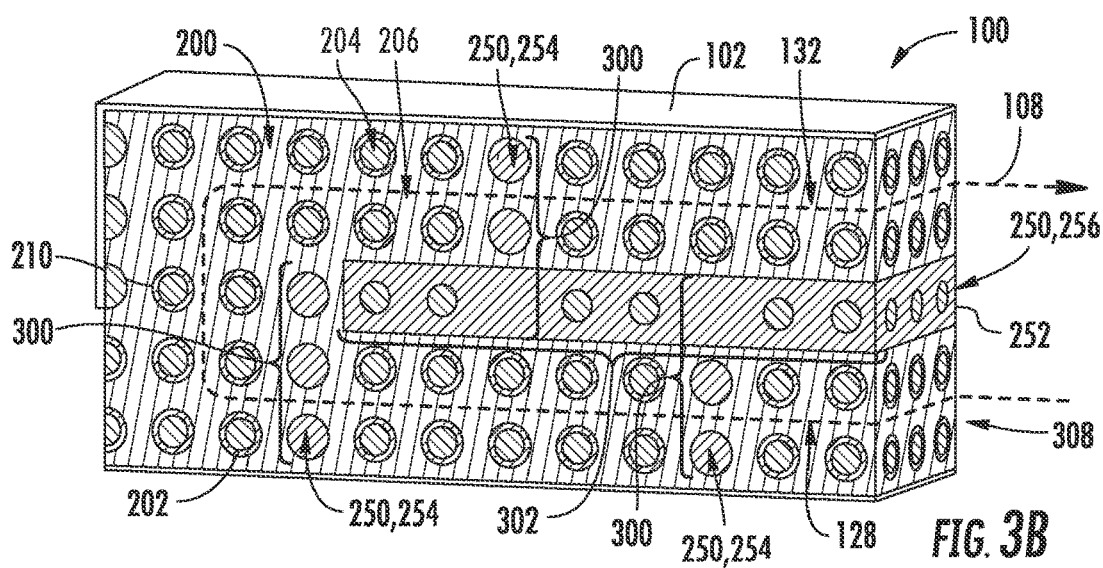
Figure 3C:
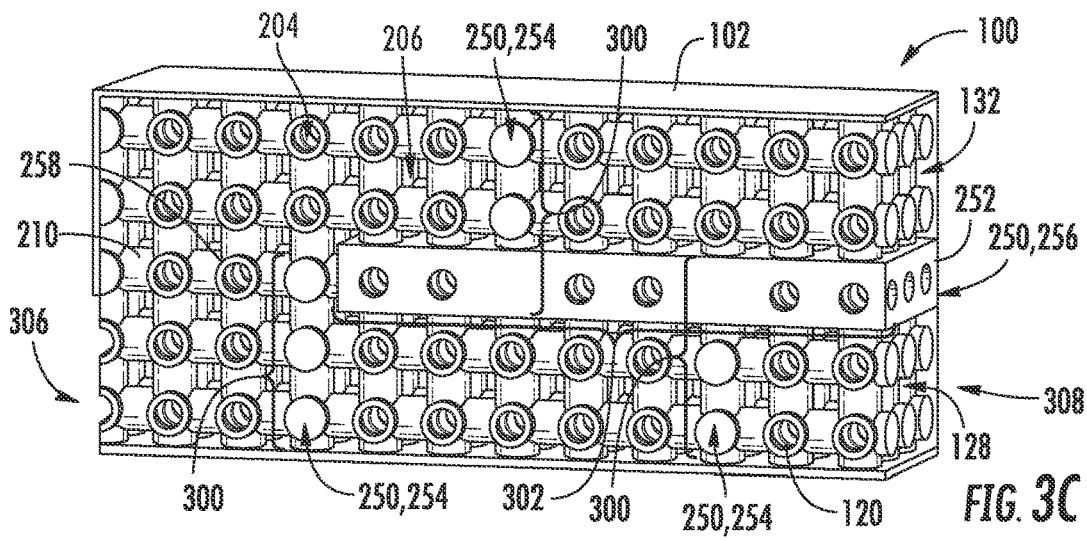

As shown in FIGS. 2E and 2H, the solid domain 252 of a baffle cell 250 may include both a first furcated-pathway blind 254 and a second furcated-pathway blind 256. The first furcated-pathway blind 254 defines a boundary to a first furcated fluid domain 204, and the second furcated-pathway blind 256 defines a boundary to a second furcated fluid domain 206. The first furcated-pathway blind 254 and the second furcated-pathway blind 256 may each define a boundary to each perimeter plane of the baffle cell 250 (FIG. 2E) or to a subset of the perimeter planes of the baffle cell (FIG. 2H). As shown in FIG. 2E, the solid domain 252 of a baffle cell 250 may occupy the entirety of the baffle cell 250. Alternatively, as shown in FIG. 2H, the solid domain 252 of a baffle cell 250 may include an exterior baffle-cell surface 258 that defines a second furcated fluid domain 206, and an interior baffle-cell surface 260 that defines a first furcated fluid domain 204.

Now turning to FIGS. 3A-3C, an exemplary three-dimensional lattice 104 of a heat exchanger 100 will be discussed in further detail. The exemplary heat exchanger 100 shown in FIGS. 3A-3C includes a three-dimensional lattice 104 of repeating unit cells. The three-dimensional lattice 104 is defined by a plurality of integrally formed contiguous unit cells. The unit cells include a plurality of pathway cells 200 and a plurality of baffle cells 250, each conforming to the three-dimensional lattice. The plurality of pathway cells 200 have a solid domain 202 that includes an interior pathway-cell surface 208 contiguously defining a first furcated fluid domain 204 for a first fluid 138 to flow across the plurality of pathway cells 200. The solid domain 202 of the plurality of pathway cells 200 additionally includes an exterior pathway-cell surface 210 contiguously defining a second furcated fluid domain 206 for a second fluid 144 to flow across the plurality of pathway cells 200. The plurality of baffle cells 250 are integrally formed among the plurality of pathway cells 200. The plurality of baffle cells 250 have a solid domain 252 that includes one or more first furcated-pathway blinds 254 and/or one or more second furcated-pathway blinds 256.

An exemplary three dimensional lattice 104 may include one or more first furcated-pathway baffles 300 and/or one or more second furcated-pathway baffles 302. A first furcated-pathway baffle 300 may include baffle cells 250 that have one or more first furcated-pathway blinds 254 and/or one or more second furcated pathway blinds 256. A second furcated-pathway baffle 302 may include baffle cells 250 that have one or more second furcated pathway blinds 256 and/or one or more first furcated-pathway blinds 254. A plurality of integrally formed contiguous baffle cells that each include a first furcated-pathway blind 254 together provide a first furcated-pathway baffle 300 within the three-dimensional lattice 104 that contiguously defines a boundary to the first furcated fluid domain 204. A plurality of integrally formed contiguous baffle cells 250 that each include a second furcated-pathway blind 256 together provide a second furcated-pathway baffle 302 within the three-dimensional lattice 104 that contiguously defines a boundary to the second furcated fluid domain 206. A three-dimensional lattice may include one or more first furcated-pathway baffles 300 each contiguously defining a boundary to the first furcated fluid domain 204. Additionally or in the alternative, a three-dimensional lattice may include one or more second furcated-pathway baffles 302 each contiguously defining a boundary to the second furcated fluid domain 206.

A first furcated-pathway baffle 300 may include an exterior baffle-cell surface 258 contiguous with at least a portion of the exterior pathway-cell surface 210 of the pathway cells 200. Such an exterior baffle-cell surface 258 further contiguously defines the second furcated fluid domain 206, and allows for the second fluid 144 to flow across the plurality of baffle cells 250 that include the at least one of the first furcated-pathway blinds 254. A second furcated-pathway baffle 302 may include an interior baffle-cell surface 260 contiguous with at least a portion of the interior pathway-cell surface 208. Such an interior baffle-cell surface 260 further contiguously defines the first furcated fluid domain 204, and allows for the first fluid 138 to flow across the plurality of baffle cells 250 comprising the at least one of the second furcated-pathway baffles.

An interior pathway-cell surface 208 of the plurality of pathway cells 200 and the one or more first furcated-pathway baffles 300 together define a first furcated serpentine flow passage 106 for the first fluid 138 to flow through the first furcated fluid domain 204. By way of example, and without limitation, the first furcated serpentine flow passage 106 may include a one-pass configuration, a two-pass configuration, a multi-pass configuration, a split-flow configuration, a combined-flow configuration, and a spiral-flow configuration. The first furcated serpentine flow passage 106 may partially or entirely overlap with the second serpentine flow passage 108. The first furcated serpentine flow passage 106 may intersect the second furcated serpentine flow passage 108 one or more times. The first furcated serpentine flow passage 106 may pass through at least some of the baffle cells 250 that have a second furcated-pathway blind 256. The second furcated serpentine flow passage 108 may pass through at least some of the baffle cells 250 that have a first furcated-pathway blind 156.

An exterior pathway-cell surface 210 of the plurality of pathway cells 200 and the one or more second furcated-pathway baffles 302 together define a second furcated serpentine flow passage 108 for the second fluid 144 to flow through the second furcated fluid domain 206. Any flow orientation may be provided for the first furcated serpentine flow passage 106 and for the second furcated serpentine flow passage 108. By way of example, and without limitation, the second furcated serpentine flow passage 108 may include a one-pass configuration, a two-pass configuration, a multi-pass configuration, a split-flow configuration, a combined-flow configuration, and a spiral-flow configuration.

The first furcated serpentine flow passage 106 and the second furcated serpentine flow passage 108 may be oriented relative to one another in any desired configuration. By way of example, and without limitation, at least a portion of the first furcated serpentine flow passage 106 and at least a portion of the second furcated serpentine flow passage 108 may be configured and arranged relative to one another with a parallel-flow orientation, a counter-flow orientation, and/or a cross-flow orientation. For the three-dimensional lattice 104 shown in FIGS. 3A-3C, the first furcated serpentine flow passage 106 and the second furcated serpentine flow passage 108 have a parallel-flow orientation around at least a portion of the top left region of the three-dimensional lattice 104, a counter-flow orientation around at least a portion of the bottom center region of the three-dimensional lattice 104, and a cross-flow orientation around at least a portion of the right-side region of the three-dimensional lattice 104.

It will be appreciated that the baffle cells 250 may be selectively positioned throughout the three-dimensional lattice 104 with any desired configuration or arrangement, allowing for flow passages 106, 108 with any desired configuration and arrangement. As such, flow passages 106, 108 may be selectively configured and arranged to provide improved heat transfer throughout the heat exchanger 100.

During operation of the heat exchanger 100, the first fluid 138 flows through the first furcated fluid domain 204 of the three-dimensional lattice 104 generally following the first serpentine flow passage 106, and the second fluid 144 flows through the second furcated fluid domain 206 of the three-dimensional lattice 104 generally following the second serpentine flow passage 108. The first fluid 138 may be a relatively hot fluid and the second fluid 144 may be a relatively cool fluid, or vice versa. Heat may transfer between the first fluid and the second fluid through the solid domain 202, 252 separating the first fluid domain 204 from the second fluid domain 206.

The first fluid 138 flows from a first-fluid inlet plenum 114 to a first-fluid inlet region 116 of the first furcated fluid domain 204, through the first furcated serpentine flow passage 106, and out through an outlet region 120 of the first furcated fluid domain 204 to a first-fluid outlet plenum 118. The second fluid 144 flows from a second-fluid inlet plenum 126 to a second-fluid inlet region 128 of the second furcated fluid domain 206, through the second furcated serpentine flow passage 108, and out through an outlet region 132 of the second furcated fluid domain 206 to a second-fluid outlet plenum 130.

In some embodiments, fluid entering the three-dimensional lattice structure may exhibit a significant pressure loss. Typically the shear stress is highest at the respective unit cell entrances of the three-dimensional lattice 104, where the boundary layer thickness is the smallest. The boundary layer thickens as shear stress subsides, and the fluid may exhibit fully developed flow characteristics. The pressure loss may be described with a resistance coefficient, K corresponding to the entrance geometry of the unit cells at the interface between the respective fluid inlet plenum and the inlet region of the respective fluid domain. Several methods are known in the art for determining a resistance coefficient, K. As one example, a resistant coefficient, K may be calculated as:

$$K = \left(f\frac{L}{D}\right),$$

where f is a friction factor, L is an equivalent length of a unit cell entrance, and D is an internal diameter or cross-section of a unit cell. A larger resistance coefficient corresponds to a larger pressure loss across the entrance of the unit cell. In some embodiments, the resistance coefficient, K may be minimized or lowered by reducing the equivalent length, L of the unit cell entrance. A lower resistance coefficient, K corresponds to a smaller pressure loss across the entrance of the unit cell.

Exemplary resistance coefficient, K values for various unit cell entrance geometries are provided in FIG. 4. A unit cell that has a flush or square-edged entrance facing the inlet plenum may have a resistance coefficient, K of about 0.5, such as between 0.4 and 0.6, or between 0.45 and 0.55. A unit cell that has an outward-projecting entrance facing the inlet plenum may have a resistance coefficient, K of about 0.78, such as between 0.7 and 0.85, or between 0.75 and 0.8. By contrast, a unit cell that has a rounded unit cell entrance facing the inlet plenum may have a much lower resistance coefficient, K, which may be calculated as:

$$K = \left(f\frac{r}{D}\right),$$

where f is a friction factor, r is the radius of the rounded unit cell entrance, and D is an internal diameter or cross-section of a unit cell. A unit cell that has a rounded unit cell entrance may have a resistance coefficient, K ranging from 0.02 to 0.4, such as from 0.04 to 0.35, such as from 0.02 and 0.09, such as from 0.04 and 0.15, such as from 0.09 and 0.24, such as from 0.15 and 0.28, such as from 0.24 and 0.3. The resistance coefficient, K for a unit cell that has a rounded unit cell entrance may range from greater than 0.02 to less than 0.4, such as 0.3 or less, such as 0.28 or less, such as 0.24 or less, such as 0.15 or less, such as 0.09 or less, such as 0.04 or less.

As shown in FIGS. 2A and 2B, a pathway cell 200 includes a solid domain 202 which when positioned adjacent to a first-fluid inlet plenum 114, may provide a flush or square-edged entrance to the first fluid domain 204 facing the first-fluid inlet plenum 114. In some embodiments, the solid domain 202 of the pathway cell shown in FIGS. 2A and 2B may provide an outward-projecting entrance to the first fluid domain 204. On the other hand, the solid domain 202 of the pathway cell 200 shown in FIGS. 2A and 2B includes an exterior pathway-cell surface 210 which may provide a rounded unit cell entrance to the second fluid domain 206 when positioned adjacent to a second-fluid inlet plenum 126. Such a rounded unit cell entrance to the second fluid domain 206 advantageously exhibits a minimized or lowered resistance coefficient, K. However, the square-edged or outward-projecting entrance to the first fluid domain may exhibit a much higher resistance coefficient, K relative to the entrance to the second fluid domain.

In some embodiments, however, the three-dimensional lattice 104 of repeating unit cells may include a rounded unit cell entrance to both the first fluid domain and the second fluid domain. This may be accomplished, for example, by including a plurality of partial unit cells 304 among the plurality of integrally formed contiguous unit cells defining the three-dimensional lattice 104. The plurality of partial unit cells 304 are similarly integrally formed and contiguous, and similarly define a respective portion of the three-dimensional lattice 104 of repeating unit cells. Such partial unit cells 304 introduce a partial phase-shift to the three-dimensional lattice 104 of repeating unit cells. The size of the phase-shift corresponds to the proportion of a partial unit cell 304 to a whole unit cell. The partial unit cells 304 may introduce a partial phase-shift ranging from $\frac{1}{16}^{th}$ to $\frac{15}{16}^{th}$ of a phase, such as from $\frac{1}{8}^{th}$ to $\frac{7}{8}^{th}$ of a phase, such as from $\frac{1}{4}^{th}$ to ¾$^{th}$ of a phase, such as ⅜$^{th}$ to ⅝$^{th}$ of a phase. In an exemplary embodiment, the partial phase-shift is ½ of a phase.

The partial unit cells 304 may be provided at any desired location of the three-dimensional lattice 104, including at a first-fluid inlet region 116 (e.g., adjacent to the first-fluid inlet plenum 114), at a second-fluid inlet region 128 (e.g., adjacent to the second-fluid inlet plenum 126), and/or at a middle region of the three-dimensional lattice 104. The partial unit cells may be partial pathway cells 200 and/or partial baffle cells 250. For example, partial baffle cells 250 may include a first furcated-pathway blind 254 and/or a second furcated-pathway blind 256.

Figure 5C:
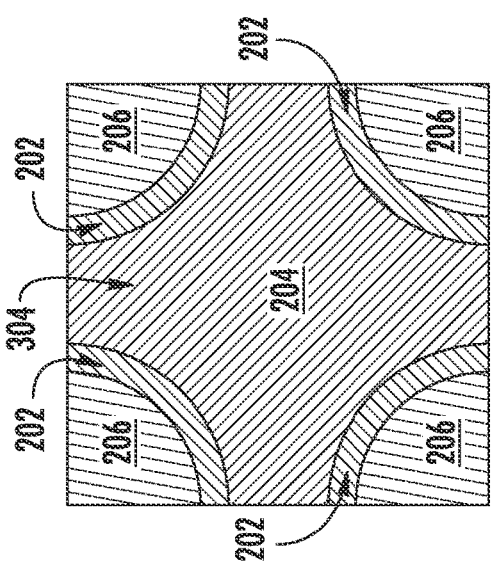
FIGS. 5A-5C schematically depict an exemplary partial unit cell and a corresponding rounded unit cell entrance to the three-dimensional lattice for a first fluid.
Figure 6C:
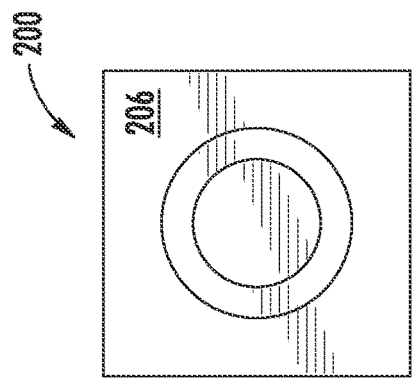
FIGS. 6A-6C schematically depict an exemplary pathway cell and a corresponding rounded unit cell entrance to the three-dimensional lattice for a second fluid.
Figure 5B:
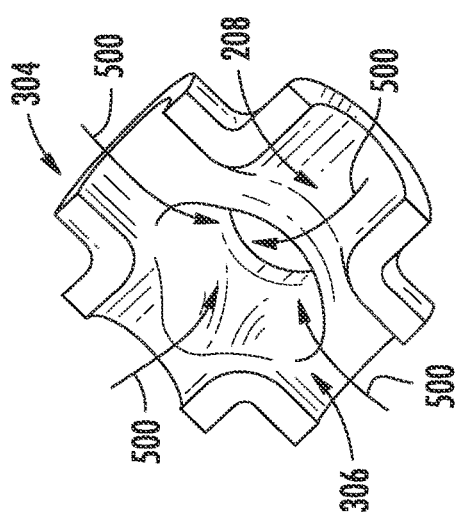
Figure 6B:
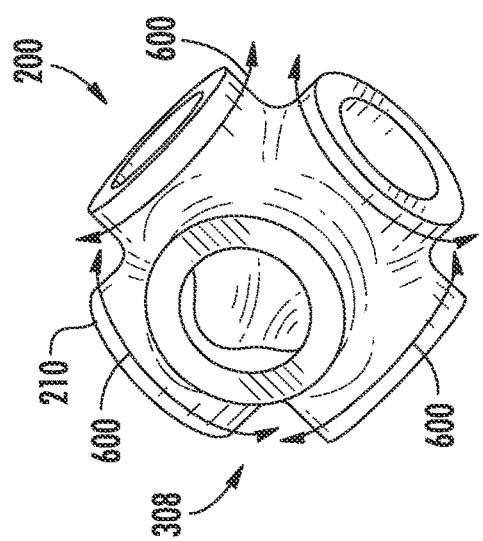
Figure 5A:
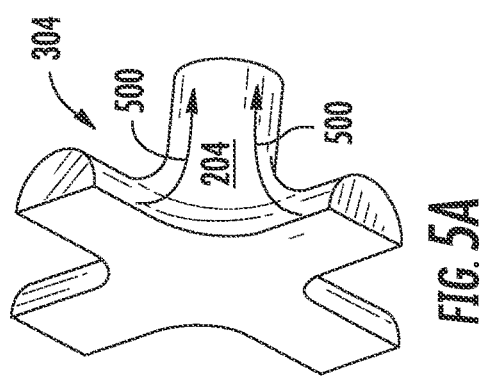
Figure 6A:
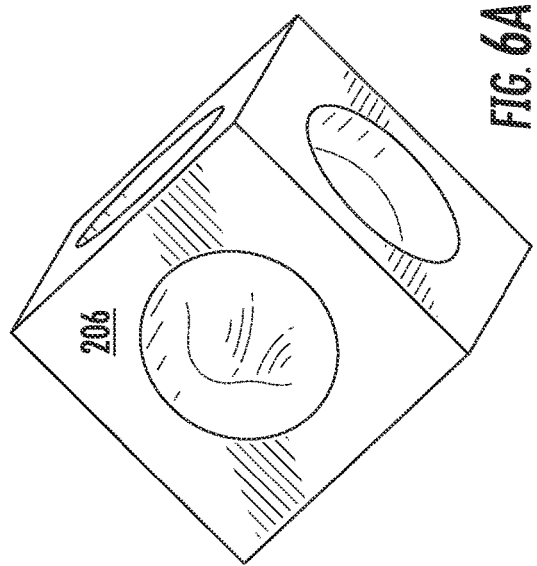

As shown in FIGS. 3A-3C, in one embodiment a plurality of partial pathway cells 304 are provided at a first-fluid inlet region 116, which may be adjacent to the first-fluid inlet plenum 114 (FIG. 1). As such, the three-dimensional lattice 104 of repeating unit cells includes a first rounded unit cell entrance 306 to the first fluid domain 204. The partial pathway cells 304 and corresponding first rounded unit cell entrance 306 to the first-fluid domain 204 are more clearly depicted in FIGS. 5A-5C. As shown, a first fluid 138 follows a rounded flow passage 500 defined by the interior pathway-cell surface 208 of the partial pathway cells 304. The three-dimensional lattice 104 also includes a second rounded unit cell entrance 308 to the second fluid domain 206. The second rounded unit cell entrance 308 to the second fluid domain 206 corresponding to the exterior pathway-cell surface 210 of the pathway cells 200 are more depicted in FIGS. 6A-6C. As shown, a second fluid 144 follows a rounded flow passage 600 defined by the interior pathway-cell surface 208 of the pathway cells 200. In another embodiment, all or a portion of the three-dimensional lattice 104 of repeating unit cells may be shifted by a partial phase, and a plurality of partial unit cells 304 may be provided adjacent to the second-fluid inlet plenum 126 (FIG. 1), similarly providing a first rounded unit cell entrance 306 to the first fluid domain 204 and a second rounded unit cell entrance 308 to the second fluid domain 206.

Any desired technology may be used to manufacture various aspects of the heat exchanger 100, including the three-dimensional lattice 104 and the respective unit cells thereof, and various other components described herein. Technologies that may be used to manufacture such various components include additive manufacturing, machining, drilling, casting, or a combination thereof, or any other technique. An additive manufacturing process may include any process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Binder Jetting (BJ), Material Jetting (MJ), Photopolymer Jetting (PJ), Stereolithography (SLA), Electron Beam Melting (EBM), Fused Deposition Modeling (FDM), Laser Engineered Net Shaping (LENS), Direct Metal Deposition (DMD), and Hybrid Processes (HP).

Any desired materials may be used to manufacture various aspects of the heat exchanger 100, including the three-dimensional lattice 104 and the respective unit cells thereof, and various other components described herein. Materials that may be used to manufacture such various components include aluminum alloys, steel alloys, titanium alloys, nickel alloys (e.g., superalloys), and composites such as ceramic matrix composite (CMC) materials. Exemplary CMC materials may include silicon carbide, silicon, silica, or alumina matrix materials and combinations thereof. Ceramic fibers may be embedded within the matrix, such as oxidation stable reinforcing fibers including monofilaments like sapphire and silicon carbide, yarn including silicon carbide, alumina silicates, and chopped whiskers and fibers, and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth. In some embodiments, the material forming the three-dimensional lattice 104 may be a material adapted to facilitate heat transfer, such as a thermally conductive material.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger comprising:
   a three-dimensional lattice of integrally formed unit cells comprising an interior pathway-cell surface contiguously defining a first furcated fluid domain for a first fluid to flow, and an exterior pathway-cell surface contiguously defining a second furcated fluid domain for a second fluid to flow;
   a first furcated-pathway baffle integrally formed among the three-dimensional lattice, the first furcated-pathway baffle contiguously defining a first boundary to the first furcated fluid domain, wherein the first furcated-pathway baffle comprises an exterior baffle-cell surface contiguous with at least a portion of the exterior pathway-cell surface; and
   a second furcated-pathway baffle integrally formed among the three-dimensional lattice, the second furcated-pathway baffle contiguously defining a second boundary to the second furcated fluid domain, wherein the second furcated-pathway baffle comprises an interior baffle-cell surface contiguous with at least a portion of the interior pathway-cell surface,
   wherein the interior pathway-cell surface and the first furcated-pathway baffle together define a first furcated serpentine flow passage for the first fluid to flow through the first furcated fluid domain, and wherein the exterior pathway-cell surface and the second furcated-pathway baffle together define a second furcated serpentine flow passage for the second fluid to flow through the second furcated fluid domain.

2. The heat exchanger of claim 1, wherein the three-dimensional lattice of integrally formed unit cells comprises:
   a plurality of pathway cells having a solid domain defined at least in part by the interior pathway-cell surface and the exterior pathway-cell surface.

3. The heat exchanger of claim 1, wherein the first furcated-pathway baffle comprises a plurality of first baffle cells integrally formed among the three-dimensional lattice of integrally formed unit cells.

4. The heat exchanger of claim 1, wherein the second furcated-pathway baffle comprises a plurality of second baffle cells integrally formed among the three-dimensional lattice of integrally formed unit cells.

5. The heat exchanger of claim 1, wherein the three-dimensional lattice of integrally formed unit cells comprises:
one or more first furcated-pathway blinds defining a first boundary to the first furcated fluid domain; and
one or more second furcated-pathway blinds defining a second boundary to the second furcated fluid domain, wherein the first furcated serpentine flow passage passes through at least some of the one or more second furcated-pathway blinds, wherein the second furcated serpentine flow passage passes through at least some of the one or more first furcated-pathway blinds, and wherein at least a portion of the first furcated serpentine flow passage and at least a portion of the second furcated serpentine flow passage are configured and arranged relative to one another with a parallel-flow orientation, a counter-flow orientation, or a cross-flow orientation.

6. The heat exchanger of claim 5, wherein the first furcated-pathway baffle is defined at least in part by the one or more first furcated-pathway blinds.

7. The heat exchanger of claim 6, wherein the second furcated-pathway baffle is defined at least in part by the one or more second furcated-pathway blinds.

8. The heat exchanger of claim 1, comprising:
a body surrounding the three-dimensional lattice of integrally formed unit cells.

9. The heat exchanger of claim 1, wherein the first furcated-pathway baffle comprises one or more second furcated-pathway blinds; and
wherein the second furcated-pathway baffle comprises one or more first furcated-pathway blinds.

10. The heat exchanger of claim 1, wherein the first furcated serpentine flow passage passes through the second furcated-pathway baffle, and wherein the second furcated serpentine flow passage passes through the first furcated-pathway baffle.

11. The heat exchanger of claim 1, wherein at least a portion of the first furcated serpentine flow passage and at least a portion of the second furcated serpentine flow passage are configured and arranged relative to one another with a parallel-flow orientation, a counter-flow orientation, or a cross-flow orientation.

12. The heat exchanger of claim 1, wherein the first furcated serpentine flow passage or the second furcated serpentine flow passage comprises:
a one-pass configuration, a two-pass configuration, a multi-pass configuration, a split-flow configuration, a combined-flow configuration and a spiral flow configuration.

13. The heat exchanger of claim 1, wherein the first fluid comprises a process fluid and the second fluid comprise a coolant, the coolant comprising a liquid or a gas.

14. The heat exchanger of claim 1, further comprising:
a first inlet manifold defining a first inlet plenum, the first inlet plenum in fluid communication with the first furcated fluid domain, and a first outlet manifold defining a first outlet plenum, the first outlet plenum in fluid communication with the first furcated fluid domain; and
a second inlet manifold defining a second inlet plenum, the second inlet plenum in fluid communication with the second furcated fluid domain, and a second outlet manifold defining a second outlet plenum, the second outlet plenum in fluid communication with the second furcated fluid domain.

15. The heat exchanger of claim 1, wherein the exterior baffle-cell surface defines a portion of the second furcated fluid domain; and wherein the interior baffle-cell surface defines a portion of the first furcated fluid domain.

16. The heat exchanger of claim 1, wherein the three-dimensional lattice of integrally formed unit cells comprises a plurality of partial unit cells, the partial unit cells comprising partial pathway cells and partial baffle cells.

17. The heat exchanger of claim 1, wherein the first furcated-pathway baffle and the second furcated-pathway baffle respectively comprise one or more baffle cells, the one or more baffle cells defining a hollow space isolated from the first furcated fluid domain and the second furcated fluid domain.

18. The heat exchanger of claim 1, wherein the three-dimensional lattice of integrally formed unit cells comprises a three-dimensional space defined by at least four perimeter planes, and wherein the first furcated fluid domain intersects at least some of the unit cells on each of the at least four perimeter planes, and wherein the second furcated fluid domain intersects at least some of the unit cells on each of the at least four perimeter planes.

19. The heat exchanger of claim 1, wherein the three-dimensional lattice of integrally formed unit cells defines at least a portion of an additively manufactured three-dimensional object.

* * * * *